United States Patent [19]
Duesel, Jr.

[11] Patent Number: 5,342,482
[45] Date of Patent: Aug. 30, 1994

[54] LEACHATE EVAPORATION SYSTEM

[76] Inventor: Bernard F. Duesel, Jr., R.D. #3 Box 289, Goshen, N.Y. 10924

[21] Appl. No.: 898,921

[22] Filed: Jun. 12, 1992

[51] Int. Cl.$^5$ .............................................. B01D 1/14
[52] U.S. Cl. .................... 159/DIG. 2; 159/29; 159/46; 159/47.3; 202/234; 203/100; 210/170; 405/129
[58] Field of Search ............... 159/16.2, 29, 905, 16.1, 159/46, 47.3; 210/170; 405/128, 129; 203/100; 202/234

[56] References Cited

U.S. PATENT DOCUMENTS

| | | | |
|---|---|---|---|
| 2,756,035 | 7/1956 | Axelrad et al. | 210/170 |
| 2,764,234 | 9/1956 | Rauh | 159/16.2 |
| 3,215,189 | 11/1965 | Bauer | 159/16.2 |
| 3,449,247 | 6/1969 | Bauer | 210/170 |
| 3,586,624 | 6/1971 | Larson . | |
| 3,622,511 | 11/1971 | Pizzo et al. . | |
| 3,705,851 | 12/1972 | Brauer . | |
| 3,732,911 | 5/1973 | Lowe et al. . | |
| 3,835,909 | 9/1974 | Douglas et al. | 159/16.2 |
| 4,016,028 | 4/1977 | Young et al. . | |
| 4,278,494 | 7/1981 | Lilja et al. . | |
| 4,323,367 | 4/1982 | Ghosh . | |
| 4,995,969 | 2/1991 | LaVigne . | |
| 5,024,770 | 6/1991 | Boyd et al. . | |
| 5,032,230 | 7/1991 | Shepherd | 159/905 |
| 5,139,365 | 8/1992 | Chesner | 405/129 |
| 5,188,041 | 2/1993 | Noland et al. | 405/128 |

Primary Examiner—Wilbur Bascomb, Jr.
Attorney, Agent, or Firm—Brumbaugh, Graves, Donohue & Raymond

[57] ABSTRACT

In the representative leachate treatment system disclosed in the specification, leachate is supplied to a submerged combustion gas evaporator having a downwardly-directed central burner supplying combustion gases through a downcomer to a combustion gas distributor in an evaporation zone. A conical baffle beneath the gas distributor separates the evaporation zone from a quiescent settling zone in a conical bottom of the distributor from which leachate concentrate and sludge are removed. The leachate supplied to the evaporator is preheated by exhaust gases from the evaporator and combustion air supplied to the burner is preheated by leachate concentrate and sludge removed from the evaporator. Landfill gases may be used to fuel the burner and the sludge may be further concentrated and liquid from the concentrator returned to the evaporator.

13 Claims, 2 Drawing Sheets

LEACHATE EVAPORATION SYSTEM

BACKGROUND OF THE INVENTION

This invention relates to systems for treating leachate, from landfills, for example, to reduce contamination of water supplies.

As described, for example, in the patents to Larson, U.S. Pat. No. 3,586,624, and Brauer, U.S. Pat. No. 3,705,851, the liquid leachate from accumulated waste materials such as landfills may contain undesired constituents that could contaminate underground water supplies as well as surface streams and wells. Many attempts have been made to treat leachate or dispose of it in a way that avoids such contamination of water supplies. The Larson patent, for example, proposes a series of treatment lagoons to receive leachate and subject it to chemical treatment to precipitate suspended solids, as well as stabilizing lagoons and oxidation ponds. Such treatment lagoons, however, occupy a large area and must be isolated from the subsoil to prevent contamination of water supplies. After treatment in the lagoons, the treated leachate is usually returned to the landfill.

The LaVigne U.S. Pat. No. 4,995,969 treats leachate from landfills and the like by applying it to fields containing leachate-tolerant plants, which also requires a large area, and further necessitates control of the pH of the leachate within the tolerance range of the plants.

Attempts have also been made to treat leachate with microorganisms in a digester, as described in the Ghosh U.S. Pat. No. 4,323,367, for example. More complex treatment systems such as disclosed in the Boyd et al. U.S. Pat. No. 5,024,770 in which a clean refuse-derived fuel, produced by pulverizing solid waste containing leachate, is supplied to a furnace which generates heat for drying the solid waste-leachate mixture in a hot air drum.

Other leachate evaporation systems have been proposed which use, for example, plate-type evaporators and centrifugal solid separation units. Such systems have substantial surface areas which can become contaminated and clogged by vaporized leachate residues and require periodic cleaning or replacement. Moreover, they require a number of pumps or rotating centrifuge devices having drive motors which involve further energy expenditure.

Other processes have been used to concentrate waste liquid materials. The Young et al. U.S. Pat. No. 4,016,028, for example, discloses a combination of heating processes, including low-pressure and high-pressure steam heat exchangers and submerged combustion, for concentrating sodium disilicate. Similarly, the Lowe et al. U.S. Pat. No. 3,732,911 shows a submerged combustion evaporator for concentrating spent brine derived from olive processing plants, and the Lilja et al. U.S. Pat. No. 4,278,494 discloses an immersion evaporator for concentrating sulfuric acid solutions, while the Pizzo et al. U.S. Pat. No. 3,622,511 discloses a system for treating raw sewage on a small ship by macerating it and supplying it to an evaporator that employs a submersible burner in which some of the sewage is burned and the solids concentration is increased.

None of the prior art disclosures, however, provides an effective system for concentrating leachate in such a way as to avoid the necessity for evaporator heat exchange surfaces and substantial pumping or centrifuge equipment.

SUMMARY OF THE INVENTION

Accordingly, it is an object of the present invention to provide a leachate treatment system which overcomes the disadvantages of the prior art.

Another object of the invention is to provide a leachate treatment system in which leachate is concentrated by evaporation without requiring heat exchange evaporator surfaces which must be cleaned or replaced periodically and which has a minimum number of moving parts involving minimum energy input.

These and other objects of the invention are attained by providing a leachate treatment system in which leachate collected from a waste dump such as a landfill, for example, is concentrated by supplying it to an evaporator in which leachate is evaporated by direct contact with combustion gases and from which vaporized liquid is withdrawn and, if necessary, purified for discharge to the atmosphere, while concentrated leachate or leachate sludge is collected for further processing or other disposition such as return to the landfill.

The submerged combustion gas evaporator is preferably supplied, at least partially, with reclaimed hydrocarbons from the waste material such as methane collected from a landfill as fuel and either the combustion gases or the hot exhaust therefrom are dispersed beneath the surface of the leachate in the evaporator by appropriate distribution devices. Preferably, the hot gases are supplied to the distribution devices by a submersible burner in the evaporator but, if desired, another source of hot gases such as an internal combustion engine may be spaced from the evaporator and the hot gases therefrom may be piped to the distribution devices.

Moreover, the evaporator may be used in a batch, continuous or semicontinuous operation, depending upon the supply of leachate to be concentrated and on the conditions existing at the location where the system is installed. The leachate concentrator may be used as either the final treatment stage or as an intermediate stage, in which case the concentrated leachate produced by the evaporator is further treated in downstream systems, preferably located on-site so that the final leachate concentrate or sludge can be returned to the landfill. Such downstream treatment may include further drying and recovery of heat by appropriate equipment. Similarly, the vaporized liquid from the evaporator as well as the combustion gases and evaporated constituents of the leachate may be further treated to control or remove particulate material, mists, odors or pollutants before release to the atmosphere by demisters, filters, oxidation equipment and the like and heat may be extracted therefrom by appropriate heat-recovery devices.

A preferred form of leachate evaporator for use in connection with the invention includes an evaporator housing having a downwardly-converging conical bottom wall leading to a central leachate concentrate or sludge outlet and an upwardly-converging conical baffle peripherally spaced from the outer wall of the housing to provide a quiescent zone at the bottom of the housing for settling of solid constituents and leachate concentrate. A distribution assembly disposed above the baffle distributes combustion gases within the body of leachate to be concentrated in an evaporation zone so as to provide intimate contact of the gases with the leachate and adequate mixing to keep suspended solids including those which precipitate during evaporation dispersed within the evaporation zone. A burner mounted in the top of the evaporator extends downwardly into the leachate within the evaporator, but is separated therefrom by a shield to avoid direct contact with the leachate and an internal baffle designed to remove droplets of entrained liquid from the exhaust gases separates the evaporation zone from an exhaust gas collection zone.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
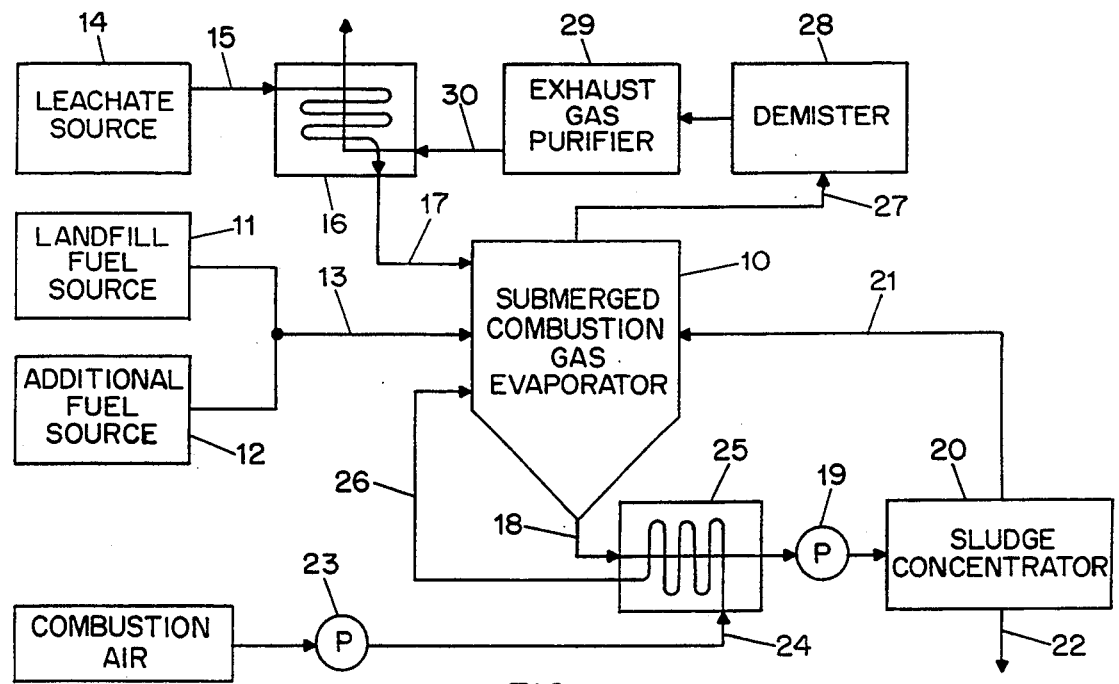
FIG. 1 is a schematic block diagram illustrating the arrangement of a representative leachate treatment system in accordance with one embodiment of the invention.

In the representative embodiment of the invention schematically illustrated in FIG. 1, a submerged combustion gas evaporator 10 receives combustible fuel from a landfill fuel source 11 providing flare gases, for example, and, if necessary, an additional fuel source 12. The evaporator may be operated on a batch, batch-continuous or continuous basis and the landfill gases may be collected and stored for use or may be supplied continuously in accordance with the needs of the evaporator. Preferably, the leachate treatment system is located closely adjacent to a landfill from which the leachate to be treated is withdrawn and the landfill flare gases are conveniently available but, if necessary, both the leachate and the landfill fuel may be piped or transported from one or more landfills at remote locations.

In the illustrated embodiment shown in FIG. 1, leachate from a leachate source 14 is transmitted through a line 15 for preheating by hot exhaust gases in a heat exchange unit 16 and then transferred through a line 17 to the inlet to the submerged combustion gas evaporator 10, which is described in more detail in connection with FIG. 2. Following evaporation of vaporizable constituents in the evaporator 10, concentrated leachate and sludge are removed through an outlet 18 and transmitted by a recycle pipe pump 19 through a sludge concentrator 20 such as a filter or centrifuge, if desired, from which liquid constituents are recycled through a line 21 to the evaporator 10, while sludge is removed through a line 22 for return to the landfill or other treatment.

Combustion air driven by a blower 23 and supplied through a line 24 is preheated by circulation through a heat exchange unit 25 through which the concentrated leachate line 18 passes, and the preheated combustion air is supplied to the evaporator 10 through a line 26. This arrangement not only improves the efficiency of the burner, but also enhances precipitate formation prior to solids removal by cooling the leachate concentrate. Exhaust gas is withdrawn from the evaporator 10 through a line 27, passed through a demister 28 in which liquid constituents are removed and then through an exhaust purification unit 29 in which exhaust constituents may be oxidized or otherwise treated to be rendered harmless before being exhausted to the atmosphere through a line 30 which passes through the heat exchange unit 16.

Figure 2:
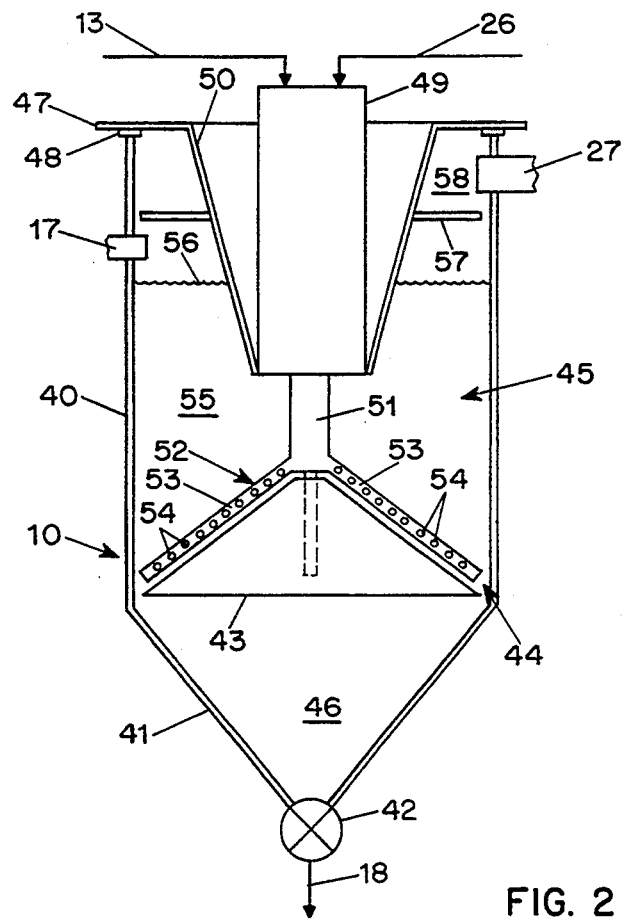
FIG. 2 is a schematic sectional view illustrating a representative evaporator for use in the leachate treatment system in accordance with the invention.

The arrangement of a preferred form of submerged combustion gas evaporator for use in the invention is illustrated in FIG. 2. As shown therein, the evaporator 10 has a housing 40 with a downwardly-converging conical bottom 41 leading to a discharge valve 42 through which concentrated leachate and sludge may pass into the discharge line 18. Within the housing 40, an upwardly-converging cone-shaped baffle 43 is positioned above the conical bottom 41 of the housing, providing a narrow peripheral opening 44 to allow solids from an evaporation zone 45 above the baffle 43 to settle from that zone to a quiescent zone 46 provided below the conical baffle in which solids can settle and be directed by the conical housing portion 41 toward the discharge valve 42. At the top of the housing 40, a cover 47 is sealed with a sealing gasket 48 to the housing wall and a burner 49 is mounted in a conical recess 50 in the cover which shields the wall of the burner from direct contact with leachate in the evaporator. Combustion gases from the burner are directed downwardly through a flame and combustion gas downcomer 51 into a distributor 52 having a series of mixing sparge pipes 53 distributed above the upper surface of the cone-shaped baffle 43. The distributor pipes have orifices 54 through which the hot combustion gases are injected into a pool of leachate 55 contained within the housing to evaporate liquid therefrom by direct-contact heat transfer.

The upper surface 56 of the leachate pool within the housing is maintained at a desired level by controlling the supply of leachate admitted into the evaporator through the line 17 from the leachate source 14. If the evaporator is being operated on a continuous basis, leachate is supplied to the evaporator continuously at an appropriate rate so as to maintain the surface 56 at the indicated level within the evaporator. On the other hand, if the evaporator is being operated on a batch basis, the leachate will be supplied continuously at an appropriate rate so as to maintain the surface 56 at the indicated level until the concentration reaches a desired value. Thereafter, the supply is terminated and the evaporator is operated until the surface of the leachate within the evaporator falls to a lower level (not shown) which is above the highest part of the gas distributor 52, at which time the evaporator will be shut down and the concentrated leachate will be discharged, after which the evaporator will be started again. When operated in a batch-continuous mode, operation proceeds as in the continuous mode, except concentrated solids are removed periodically from the discharge valve 42 without lowering the liquid level or shutting down the evaporator. As indicated in FIG. 1, fuel is supplied to the burner 49 through a line 13 and combustion air is supplied to the burner through a line 26 under sufficient pressure to provide for efficient combustion and force the combustion gases through the distributor 52 and convey the exhaust gases through the exhaust line 27. To prevent liquid from being carried into the exhaust line 17, a baffle 57 separates the evaporation zone 45 from an exhaust gas collection zone 58.

With this arrangement, evaporation of leachate from landfills or the like can be accomplished efficiently and effectively without requiring a heat exchange evaporator of the type used in conventional leachate treatment systems having surfaces which can be fouled by the leachate residue and which require periodic cleaning or replacement. Moreover, for this evaporator, only a single moving member is required, i.e., the blower 23 which supplies combustion air under pressure. Thus, the submerged combustion gas evaporator of the invention produces leachate concentrate and sludge in a simple and effective manner without the difficulties embodied in the prior art leachate handling systems.

Furthermore, even if the additional heat-recycling refinements described and illustrated in connection with FIG. 1 are used, only one additional recycle pump 19 is required. Moreover, although leachate is passed through the heat exchange units 16 and 25 in the arrangement disclosed in FIG. 1, the difficulties resulting from the prior art use of heat exchange evaporators are not encountered in those units since no evaporation is carried out and the consequent fouling of heat exchange surfaces is avoided. In simpler forms of leachate treatment systems according to the invention, the heat-recovery units may be omitted and, if no polluting contaminants are included in the exhaust from the evaporator, the exhaust treatment units 28 and 29 may also be omitted.

Figure 3:
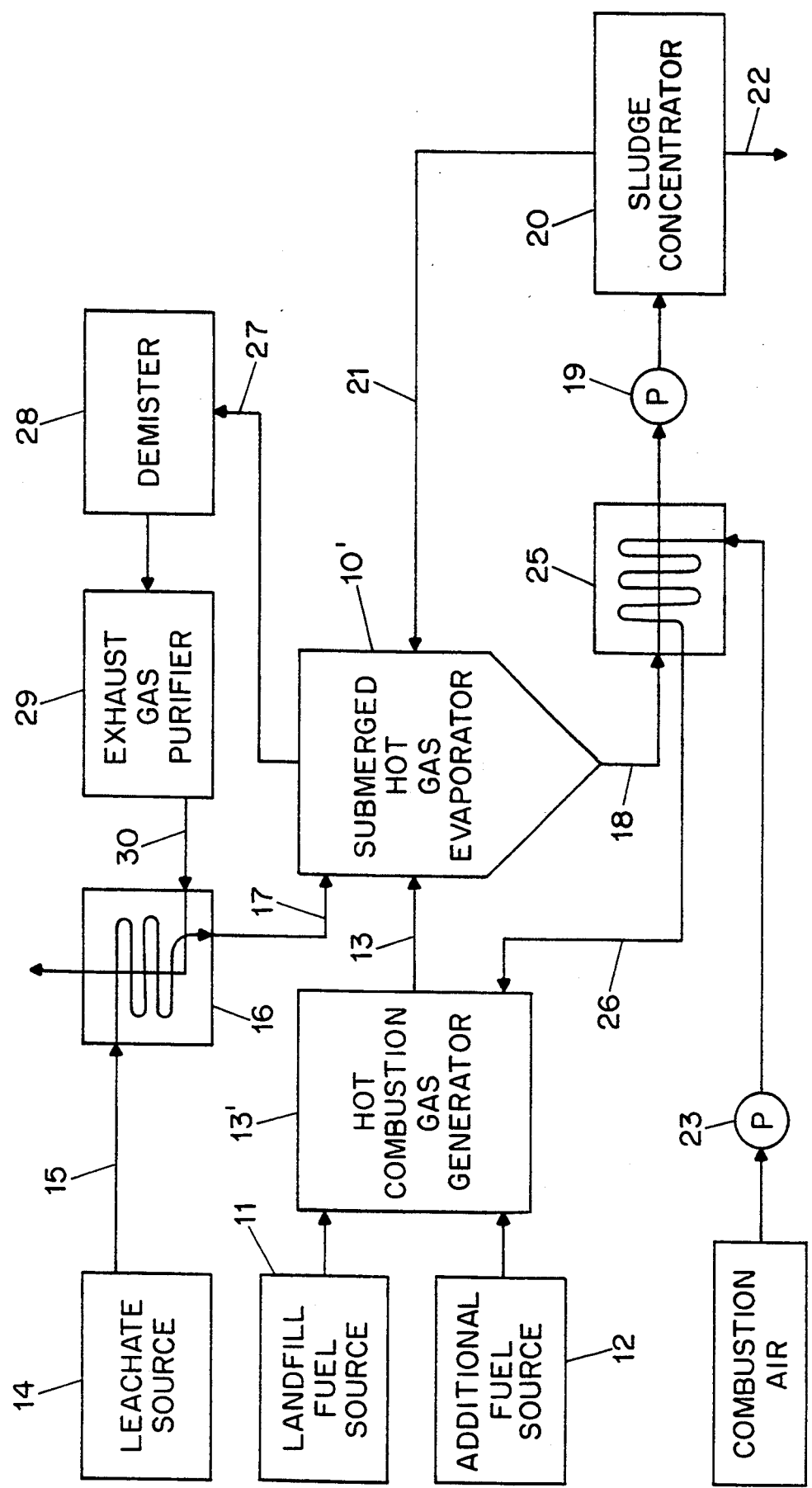
FIG. 3 is a schematic block diagram illustrating the arrangement of a representative leachate treatment system in accordance with another embodiment of the invention.

FIG. 3 illustrates an alternative embodiment which is identical to that of FIG. 1 except that, as previously described, a source of hot gases spaced from the evaporator such as a hot gas generator 13', which may, for example, be an internal combustion engine, supplies hot gases through the line 13 to the hot gas distribution devices 52 in a modified submerged hot gas evaporator 10', the air supply line 26 being connected to the hot gas generator 13' rather than to the evaporator 10'. In all other respects, the leachate treatment system of FIG. 3 is the same as that shown in FIG. 1 and the evaporator 10' is the same as the evaporator 10 illustrated in FIG. 2.

Although the invention has been described herein with reference to specific embodiments, many modifications and variations therein will readily occur to those skilled in the art. Accordingly, all such variations and modifications are included within the intended scope of the invention.

I claim:

1. A leachate treatment system comprising a leachate source, submerged combustion gas evaporator means, means for supplying leachate from the leachate source to the submerged combustion means, fuel supply means for supplying fuel to generate hot combustion gases for the evaporator means, air supply means for supplying combustion air under pressure to generate pressurized hot combustion gases for the evaporator means, distributor means for distributing hot combustion gases into a body of leachate in an evaporation zone within the evaporator means, means defining a quiescent zone spaced from the evaporation zone within the evaporator means, leachate concentrate and sludge removal means for removing sludge and concentrated leachate from the quiescent zone of the evaporator means, and exhaust gas removal means for removing exhaust combustion gases under pressure from a region above the evaporation zone in the evaporator means.

2. A leachate treatment system comprising a leachate source, submerged combustion gas evaporator means, means for supplying leachate from the leachate source to the submerged combustion gas evaporator means, fuel supply means for supplying fuel to generate hot combustion gases for the evaporator means, air supply means for supplying combustion air to generate hot combustion gases for the evaporator means, distributor means for distributing hot combustion gases into a body of leachate in an evaporation zone within the evaporator means, means defining a quiescent zone spaced from the evaporation zone within the evaporator means, leachate concentrate and sludge removal means for removing sludge and concentrated leachate from the quiescent zone of the evaporator means, and exhaust gas removal means for removing exhaust combustion gases from a region above the evaporation zone in the evaporator means, wherein the leachate source is a landfill and wherein the fuel supply means includes means for supplying landfill gases as fuel to the submerged combustion gas evaporator means.

3. A leachate treatment system according to claim 1 including first heat exchange means for conducting leachate to be supplied to the evaporator means in heat-exchange relation with exhaust gases from the evaporator means to preheat the leachate being supplied thereto.

4. A leachate treatment system comprising a leachate source, submerged combustion gas evaporator means, means for supplying leachate from the leachate source to the submerged combustion gas evaporator means, fuel supply means for supplying fuel to generate hot combustion gases for the evaporator means, air supply means for supplying combustion air to generate hot combustion gases for the evaporator means, distributor means for distributing hot combustion gases into a body of leachate in an evaporation zone within the evaporator means, means defining a quiescent zone spaced from the evaporation zone within the evaporator means, leachate concentrate and sludge removal means for removing sludge and concentrated leachate from the quiescent zone of the evaporator means, and exhaust gas removal means for removing exhaust combustion gases from a region above the evaporation zone in the evaporator means, including second heat exchange means for conducting combustion air supplied to the evaporator means in heat-exchange relation with concentrated leachate removed from the evaporator means.

5. A leachate treatment system comprising a leachate source, submerged combustion gas evaporator means, means for supplying leachate from the leachate source to the submerged combustion gas evaporator means, fuel supply means for supplying fuel to generate hot combustion gases for the evaporator means, air supply means for supplying combustion air to generate hot combustion gases for the evaporator means, distributor means for distributing hot combustion gases into a body of leachate in an evaporation zone within the evaporator means, means defining a quiescent zone spaced from the evaporation zone within the evaporator means, leachate concentrate and sludge removal means for removing sludge and concentrated leachate from the quiescent zone of the evaporator means, and exhaust gas removal means for removing exhaust combustion gases from a region above the evaporation zone in the evaporator means, including sludge concentration means receiving sludge and concentrated leachate from the submerged combustion gas evaporator means for further concentration and means for recycling liquid from the sludge concentrator means to the evaporator means.

6. A leachate treatment system according to claim 1 including exhaust gas treatment means for purifying exhaust gases from the evaporator means.

7. A leachate treatment system according to claim 1 including burner means mounted in the evaporator means for receiving fuel from the fuel supply means and air from the air supply means to generate hot combustion gases for the evaporator means.

8. A leachate treatment system comprising a leachate source, submerged hot gas evaporator means, means for supplying leachate from the leachate source to the submerged hot gas evaporator means, fuel supply means for supplying fuel to generator hot gases for the evaporator means, air supply means for supplying combustion air to generate hot gases for the evaporator means, distributor means for distributing hot gases into a body of leachate in an evaporation zone within the evaporator means, means defining a quiescent zone spaced from the evaporation zone within the evaporator means, leachate concentrate and sludge removal means for removing sludge and concentrated leachate from the quiescent zone of the evaporator means, and hot gas removal means for removing hot gases from a region above the evaporation zone in the evaporator means, including hot gas generating means spaced from the evaporator means for receiving fuel from the fuel supply means and air from the air supply means to supply hot gases to the evaporator means.

9. A leachate treatment system according to claim 8 wherein the leachate source is a landfill and wherein the fuel supply means includes means for supplying landfill gases as fuel to generate hot gas for the hot gas evaporator means.

10. A leachate treatment system according to claim 8 including first heat exchange means for conducting leachate to be supplied to the evaporator means in heat-exchange relation with hot gases from the evaporator means to preheat the leachate being supplied thereto.

11. A leachate treatment system according to claim 8 including second heat exchange means for conducting combustion air supplied to generate hot gas in heat-exchange relation with concentrated leachate removed from the evaporator means.

12. A leachate treatment system according to claim 8 including sludge concentration means receiving sludge and concentrated leachate from the submerged hot gas evaporator means for further concentration and means for recycling liquid from the sludge concentrator means to the evaporator means.

13. A leachate treatment system according to claim 8 including hot gas treatment means for purifying hot gases from the evaporator means.

* * * * *

UNITED STATES PATENT AND TRADEMARK OFFICE
CERTIFICATE OF CORRECTION

PATENT NO. : 5,342,482
DATED : August 30, 1994
INVENTOR(S) : Bernard F. Duesel, Jr.

It is certified that error appears in the above-identified patent and that said Letters Patent is hereby corrected as shown below:

Column 3, line 20: Delete the word "and".

Column 5, line 51: The words "combustion means" should read --combustion gas evaporator means--.

Column 7, line 13: The word "generator" should read --generate--.

Signed and Sealed this

Tenth Day of January, 1995

*Attest:*

BRUCE LEHMAN

*Attesting Officer*  *Commissioner of Patents and Trademarks*